United States Patent [19]
Cunningham

[11] Patent Number: 5,324,990
[45] Date of Patent: Jun. 28, 1994

[54] VOLTAGE INVERTER POWER CONSERVATION CIRCUIT

[76] Inventor: John C. Cunningham, 181 Lexington St., Apt. 33, Newton, Mass. 02166

[21] Appl. No.: 862,815

[22] Filed: Apr. 3, 1992

[51] Int. Cl.$^5$ .................... H01H 47/32; H02H 3/12; H02J 3/32
[52] U.S. Cl. .................... 307/125; 307/46; 307/87; 361/187
[58] Field of Search .................... 307/45, 46, 58, 72, 307/64–66, 75, 82, 85–87, 125, 126, 128, 130; 361/160, 170, 187; 219/10.77; 363/22, 18, 19, 23, 71

[56] References Cited

U.S. PATENT DOCUMENTS

| | | | |
|---|---|---|---|
| 3,683,198 | 8/1972 | Thode | 307/66 |
| 4,012,683 | 3/1977 | Ferro et al. | 307/100 |
| 4,488,214 | 12/1984 | Chambers | 363/71 |
| 4,508,974 | 4/1985 | Henderson | 307/66 |
| 4,667,116 | 5/1987 | Honjo et al. | 307/64 |
| 4,946,096 | 8/1990 | Ballard et al. | 307/66 |
| 4,956,563 | 9/1990 | Schornack | 307/66 |
| 4,977,351 | 12/1990 | Bavaro et al. | 315/87 |
| 5,001,623 | 3/1991 | Magid | 363/143 |
| 5,010,469 | 4/1991 | Bobry | 363/37 |
| 5,017,800 | 5/1991 | Divan | 307/66 |
| 5,055,703 | 10/1991 | Schornack | 307/64 |
| 5,111,014 | 5/1992 | Tanaka et al. | 219/10.77 |

OTHER PUBLICATIONS

Replacement Parts List for the Tripp Lite 200 Volt Inverter.

"Dimensions Unlimited Brochure" Dimensions Unlimited, Inc. (1990).

Primary Examiner—A. D. Pellinen
Assistant Examiner—Richard T. Elms
Attorney, Agent, or Firm—Bromberg & Sunstein

[57] ABSTRACT

A power conservation circuit for a battery-powered voltage inverter is capable of conserving battery power. In a first embodiment, the circuit includes a switch, connected between the input terminals and the output terminals, for switching the circuit between an ON state wherein AC voltage is connected to the output terminals, and an OFF state wherein the inverter is disconnected from the battery. A first sensor senses in the ON state the absence of a load connected to the output terminals and switches the circuit from the ON state to the OFF state. A second sensor senses in the OFF state the presence of a load connected to the output terminals and switches the circuit from the OFF state to the ON state. The switch includes a relay having a pole terminal connected to the output terminals, a first contact terminal connected to the AC output of the inverter, and a second contact terminal connected to battery voltage. In a second embodiment, in an OFF state, the switch connects to the output terminals an AC signal voltage having a frequency measurably different from the frequency of the AC voltage from the inverter. In a third embodiment, the switch switches the base of an inverter power transistor. In a fourth embodiment, the voltage inverter includes a plurality of switched voltage inverter modules.

16 Claims, 4 Drawing Sheets

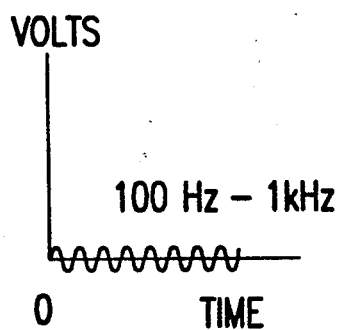
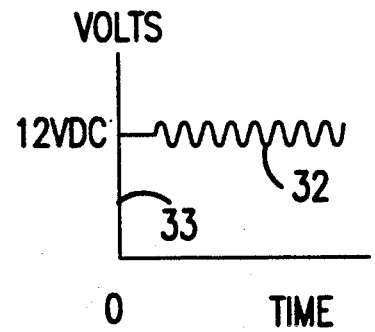
FIG.3A FIG.3B
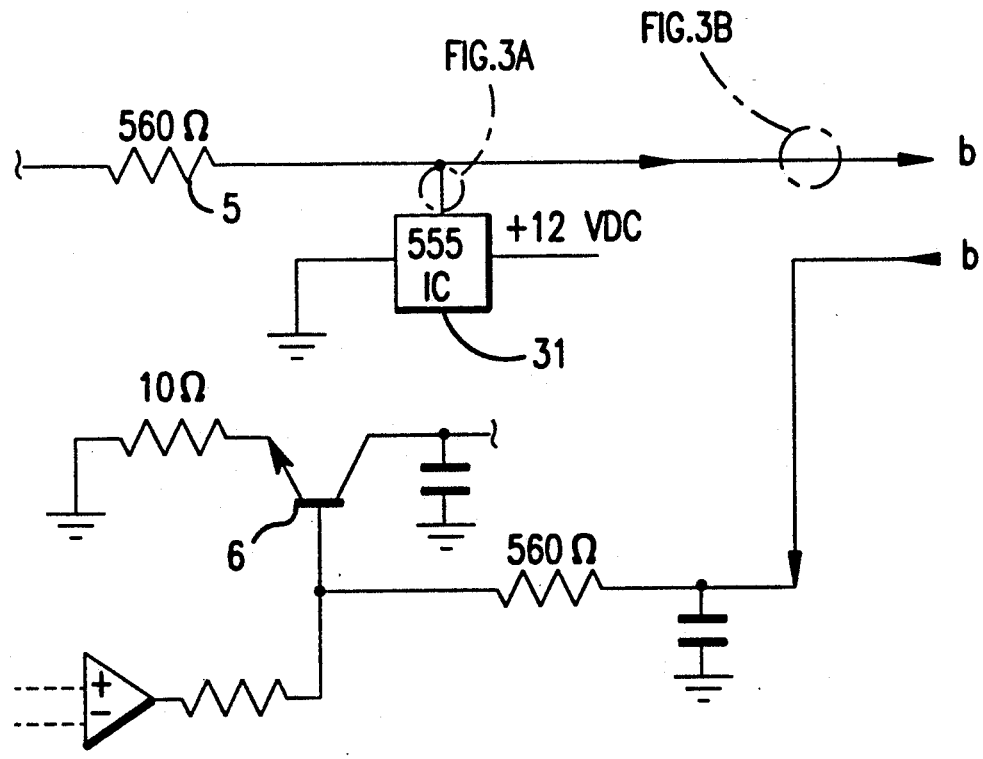
FIG.3C

VOLTAGE INVERTER POWER CONSERVATION CIRCUIT

TECHNICAL FIELD

The invention relates generally to control circuits for battery-powered inverters and more specifically to circuits for minimizing inverter power consumption.

BACKGROUND OF THE INVENTION

The following references describe relevant background art in that they disclose control circuits for controlling battery-powered inverters used for AC power supply backup.

U.S. Pat. No. 4,508,974 to Henderson discloses a logic controlled battery-powered inverter for use with a motor generator set that is used to provide clean, noise-free power to a load such as a computer. The inverter operates only when normal utility power fails, and employs the ability of the motor generator set to handle brief power outages to power the load for the brief time needed to decouple the main line power supply and couple the inverter to the motor generator.

U.S. Pat. No. 4,667,116 to Honjo et al. discloses an invertor control circuit for switching a load from an inverter to a commercial power source uninterruptedly by means of a thyristor when access to the synchronization circuit of the inverter is required for repair or servicing.

U.S. Pat. No. 4,946,096 to Ballard et al. discloses a method and apparatus for operating a furnace from a 12 V DC battery. A furnace which normally operates from a residential AC power source is adapted to operate on auxiliary DC power by changing the normal control function to prevent the furnace from operating in the high heat mode during periods of auxiliary power use.

U.S. Pat. Nos. 4,956,563 and 5,055,703 to Schornack, the Schornack '563 and the Schornack '703 references, disclose a battery operated standby inverter power supply using an electromechanical relay switching network to connect and disconnect line power between input and output terminals. An overcurrent relay pulser rapidly opens the switching system relay contacts upon transition to battery mode, and a breakover diode network accelerates field collapse in the relay coil attendant to reversion of the relay to its normally closed condition attendant to each battery to line transition. A fault detector establishes acceptable line voltage thresholds, the exceeding of either of which triggers operation from line to battery mode.

U.S. Pat. No. 4,977,351 to Bavaro discloses an emergency lighting system which permits at least one gas discharge lamp to be operated from an AC power source when AC current is present and from a battery when AC signal is not present. To conserve battery power in the DC mode, controls are also provided for turning off the light or reducing its output level in response to such control inputs as an ambient light detector or manually operated dimmer control.

U.S. Pat. No. 5,001,623 to Magid discloses a power supply which automatically adapts to different input power sources. A double pole, double throw, latching relay switches the primaries of the rectifier transformer to a series or to a parallel configuration depending upon the output voltage of the rectifier, thus adapting the circuit to either a nominal 220 V AC source or a nominal 120 V AC source. When a 24 V DC source is connected to the DC input, it is also connected to the rectifier output through a diode, so that power is furnished to the load by whichever source has the higher voltage. In this configuration, a battery pack can be connected to the DC input to supply automatic backup power.

U.S. Pat. No. 5,010,469 to Bobry discloses an uninterruptible power supply having an inverter that operates in either high voltage DC supplied by a line-powered power supply or on low voltage DC batteries. With line power, the inverter operates as an H-bridge inverter. With battery power, the battery voltage is applied to a smaller portion of the inverter's transformer primary. The changeover from line to battery power is determined by when an intermediate voltage tapped from the transformer drops below the battery voltage.

U.S. Pat. No. 5,017,800 to Divan discloses an apparatus for AC to DC to AC power conversion. It includes a rectifier bridge connected to an AC source, the rectifier bridge providing a DC output to DC bus lines. A full bridge of active switching devices is connected across the DC bus lines. The output of the bridge can provide AC output power to the load through a transformer. By providing an external DC power source such as a battery, uninterrupted power can be supplied to the load when the AC power source fails.

None of the above-mentioned references attempts to minimize inverter power consumption when no appliance is connected to the load terminals.

SUMMARY OF THE INVENTION

A power conservation circuit for a battery-powered voltage inverter is provided capable of minimizing power consumption under no-load and low-load conditions. In a first embodiment, the circuit includes a switch, connected between the input terminals and the output terminals, for switching the circuit between an ON state wherein AC voltage from the inverter is connected to the output terminals, and an OFF state wherein the inverter is disconnected from the battery. A first sensor senses in the ON state the absence of a load connected to the output terminals and provides a first signal indicative of the absence of a load. A second sensor senses in the OFF state the presence of a load connected to the output terminals and provides a second signal indicative of the presence of a load. On receiving the first signal, the switch switches from the ON state to the OFF state. On receiving the second signal, the switch switches from the OFF state to the ON state. The switch connects battery voltage to the output terminals in the OFF state. The second sensor senses current from the battery flowing through the output terminals in the OFF state. The first sensor senses AC current flowing through the output terminals in the ON state. The switch includes a relay having a pole terminal connected to the output terminals, a first contact terminal connected to the AC output of the inverter, and a second contact terminal connected to battery voltage.

In a second embodiment, in the OFF state, the switch connects to the output terminals an AC signal voltage having a frequency measurably different from the frequency of the AC voltage. The second sensor senses AC current at the frequency of the AC signal voltage passing through the output terminals.

In a third embodiment, a voltage inverter is provided, having a power transistor and a switch for switching the inverter between an ON state wherein the AC voltage is connected to the output terminals and an OFF state wherein battery voltage is connected to the output terminals. In this embodiment the switch switches the base of the power transistor. The switch may be a relay or a transistor.

In a fourth embodiment, a battery-powered voltage inverter is provided having a plurality of voltage inverter modules. Each module has a powered state and a power-conservation state and each module is connected to the output terminals. A quantity related to the AC current flowing through the output terminals is measured to provide a signal indicative of the AC current. This signal is used to switch just sufficient of the voltage inverter modules to a powered state to supply the measured current.

BRIEF DESCRIPTION OF THE DRAWINGS

FIG. 3 shows an improvement of the circuit of FIG. 1 designed to accommodate inductive and capacitive loads.

DESCRIPTION OF SPECIFIC EMBODIMENTS

The invention provides a power conservation circuit for minimizing the power consumption of a battery-powered voltage inverter under no-load and low-load conditions.

In a preferred embodiment, the power conservation circuit has an ON state in which battery voltage (12 V DC) powers the inverter and inverter output voltage (120 V AC) is applied to a load via a pair of output terminals, and an OFF state in which battery voltage is disconnected from the inverter and applied to the output terminals.

The power conservation circuit remains in the OFF state as long as there is no load across the output terminals. When a load appears across the output terminals and the circuit is an OFF state, a small current flows, powered by the 12 V DC. This current is used to switch the power conservation circuit from the OFF state to the ON state.

The power conservation circuit remains in the ON state as long as load is maintained across the output terminals. The presence of load is sensed by the flow of alternating current. The cessation of alternating current is used to switch the power conservation circuit from the ON state to the OFF state.

Figure 1:
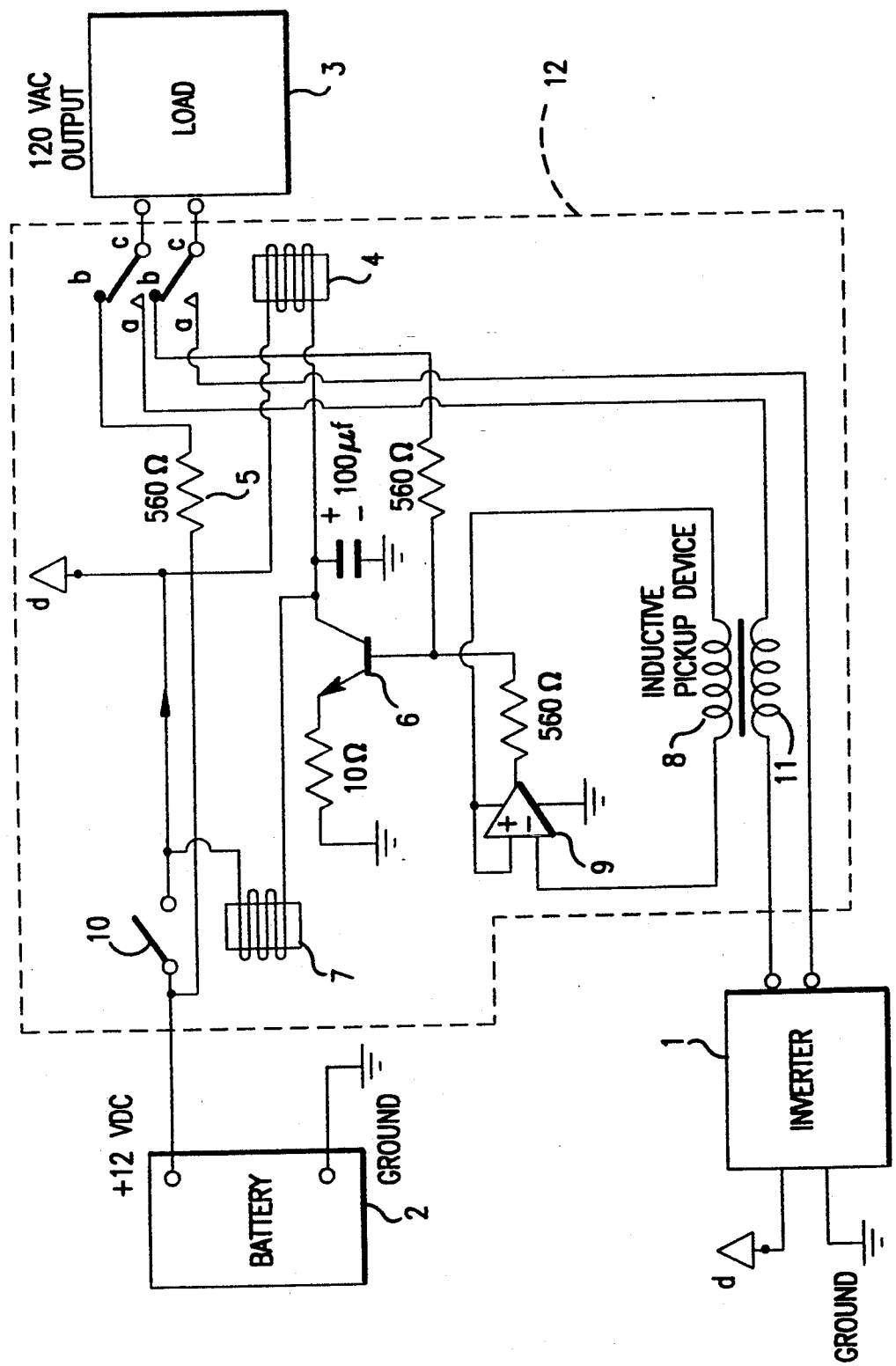
FIG. 1 is a schematic of a first embodiment of a voltage inverter control circuit designed to minimize the power consumption of the inverter under no-load conditions according to the present invention.

FIG. 1 shows the power conservation circuit 12, having circuit output terminals c-c, of a preferred embodiment of the present invention. In the ON state, relays 7 and 4 are both energized so that contact 10 is closed (relay 7) and terminals c-c are connected across a-a (relay 4). Thus, in the ON state, (i) battery 2 powers inverter 1 via switch contact 10 and connection d-d and (ii) the inverter supplies 120 V AC power via contacts a-a to circuit output terminals c-c and thence to load 3. In the OFF state, relays 7 and 4 are both de-energized so that (i) the inverter is disconnected from the battery and from the load and (ii) battery 2 supplies 12 V DC via resistor 5 and contacts b-b to terminals c-c. As long as there is no load across terminals c-c the control circuit remains in the OFF state. When a load is applied (i.e., load 3 becomes capable of passing current), a small current from battery 2 flows through resistor 5, through load 3 via contacts b-b to the base of power transistor 6, switching on the transistor. Transistor 6 may be an NTE 392 NPN power transistor. Switching on transistor 6 energizes double-pole double-throw (DPDT) relay 4 and single-pole, single-throw (SPST) relay 7. Relay 4 disconnects the load from the battery and connects the load via contacts a-a to the 120 V AC output of inverter 1. Relay 7 connects the battery to the coil of relay 4 thereby holding relay 4 energized via transistor 6. Relay 7 via (closed) contact 10 and connection d-d reconnects battery power to inverter 1, turning the inverter on.

When the circuit is in the ON state, supplying 120 V AC power via contacts a-a to load 3, load current flows through coil 11 inducing a current in an inductive pickup coil 8. This induced current, applied to the input of operational amplifier 9, holds power transistor 6 ON. Operational amplifier 9 may be a Radio Shack LM234N Quad Op-Amp.

When load is removed (i.e., load 3 stops passing current) the induced current falls to zero, transistor 6 switches OFF, relays 4 and 7 de-energize, load 3 is disconnected from the inverter output, contact 10 disconnects the inverter from the battery, and contacts a-a connect the battery to the load via output terminals c-c.

Figure 2:
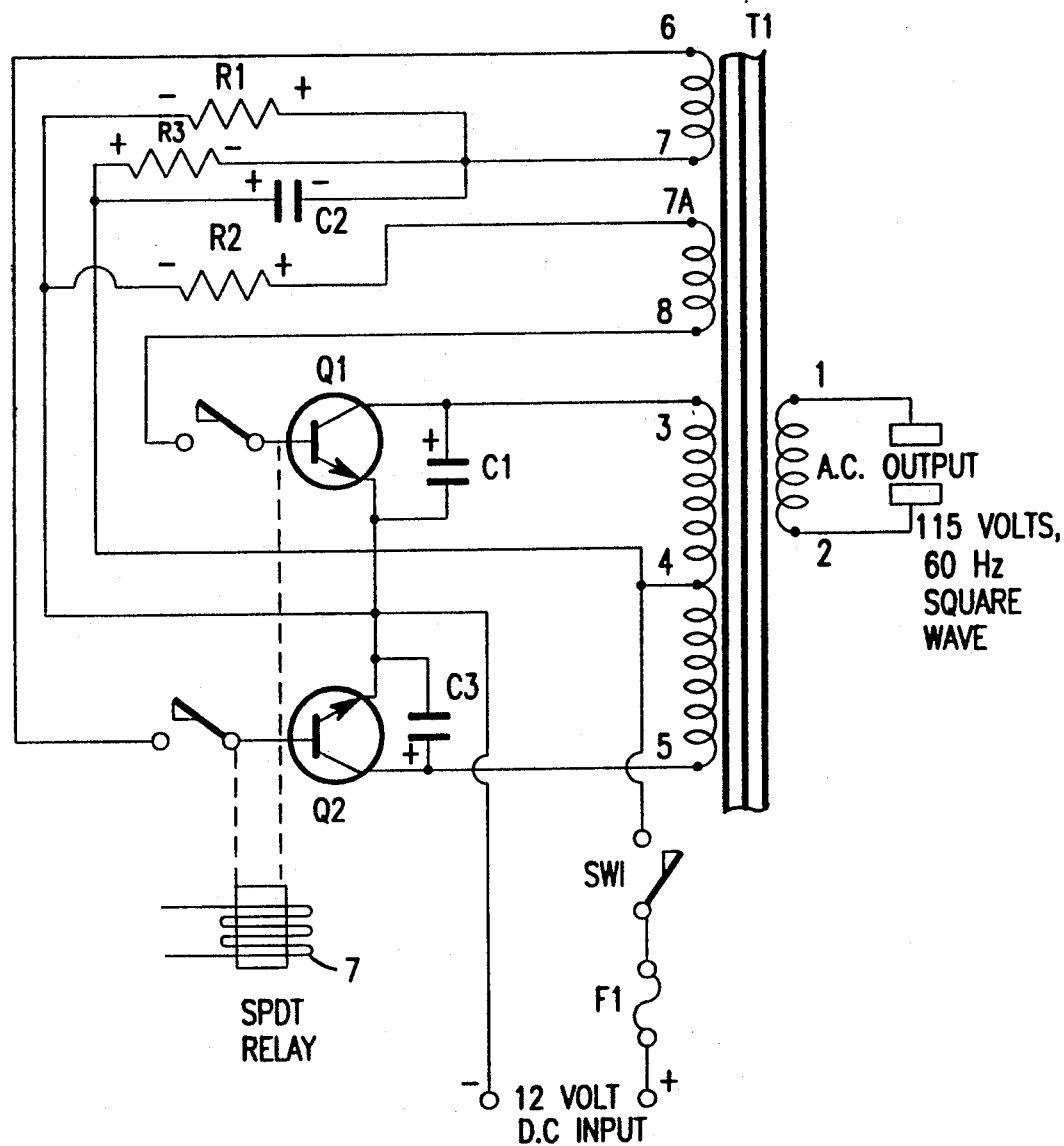
FIG. 2 shows an improvement of the circuit of FIG. 1 wherein control is effected by switching the base of each of the two power transistors.

In another embodiment the inverter is never disconnected from the battery but the base of each power transistor in the inverter is switched by a contact of relay 7 from the inverter power conservation circuit as shown in FIG. 2. Alternatively, a transistor or other semiconductor switch could be used.

An important aspect of the invention is that it provides a power conservation circuit, having load terminals, for a battery-powered inverter, the circuit having an ON state in which the load terminals are connected to inverter AC output voltage and an OFF state in which the load terminals are connected to DC battery voltage for load sensing. The battery not only provides power to the inverter when in an "ON" condition but which also supplies battery voltage to the load terminals in an OFF condition so as to detect the change in load when an appliance is connected across the load terminals.

Capacitive and Inductive Loads

With the power conservation circuit of FIG. 1, when the load is primarily capacitive, as is the case with some types of fluorescent lights, the load may draw insufficient current from the 12 V DC source for the control circuit to operate properly. In an improved embodiment of the present invention, an alternating or pulsating DC signal from a wave form generating integrated circuit 31 is connected to the load end of resistor 5 in FIG. 1. The wave form generating circuit may be a Texas Instruments 555 timer integrated circuit. FIG. 3 shows a portion of the circuit of FIG. 1 with wave form generating integrated circuit 31 connected to the load end of resistor 5. The AC signal, having a frequency distinguishably greater than 60 Hz and preferably between 100 Hz and 1 k Hz passes through the capacitive load and switches the power conservation circuit. FIG. 3 shows an AC voltage component 32 riding on a DC offset voltage component 33. The DC component is necessary for inductive loads. For example, a motor winding acting as a high inductance filter may block AC signals. To enable the power conservation control circuit to work with loads that may have a combination of resistive, capacitive and inductive characteristics, a load-detect voltage having a 12 volt DC component with an 2 volt AC component riding on top of it is provided.

Varying Loads

To minimize power consumption when supplying a given load, the capacity of the inverter should match the load. An inverter that is required to power a varying load is usually sized to supply the largest load. However, when the load decreases, the inverter power consumption does not decrease. A further improvement of the present invention minimizes the power consumption of inverter which is connected to a varying load by dynamically adjusting the capacity of the inverter to match the size of load. The inverter includes several pairs of output transistors (Q1 and Q2 of FIG. 2 repeated as Q3 and Q4; Q5 and Q6; etc.). These pairs of transistors are connected in parallel to deliver power to the primary winding of the output transformer. By switching on only the number of transistor pairs necessary to supply the required amount of power to the load (e.g., just Q1 and Q2) and leaving the rest of the transistor pairs switched off, less power is delivered to the primary winding of the output transformer of the inverter. Whenever a larger load is applied, more transistor pairs are switched on to supply the increased power (e.g., Q1 and Q2; Q3 and Q4; and Q5 and Q6).

Figure 4:
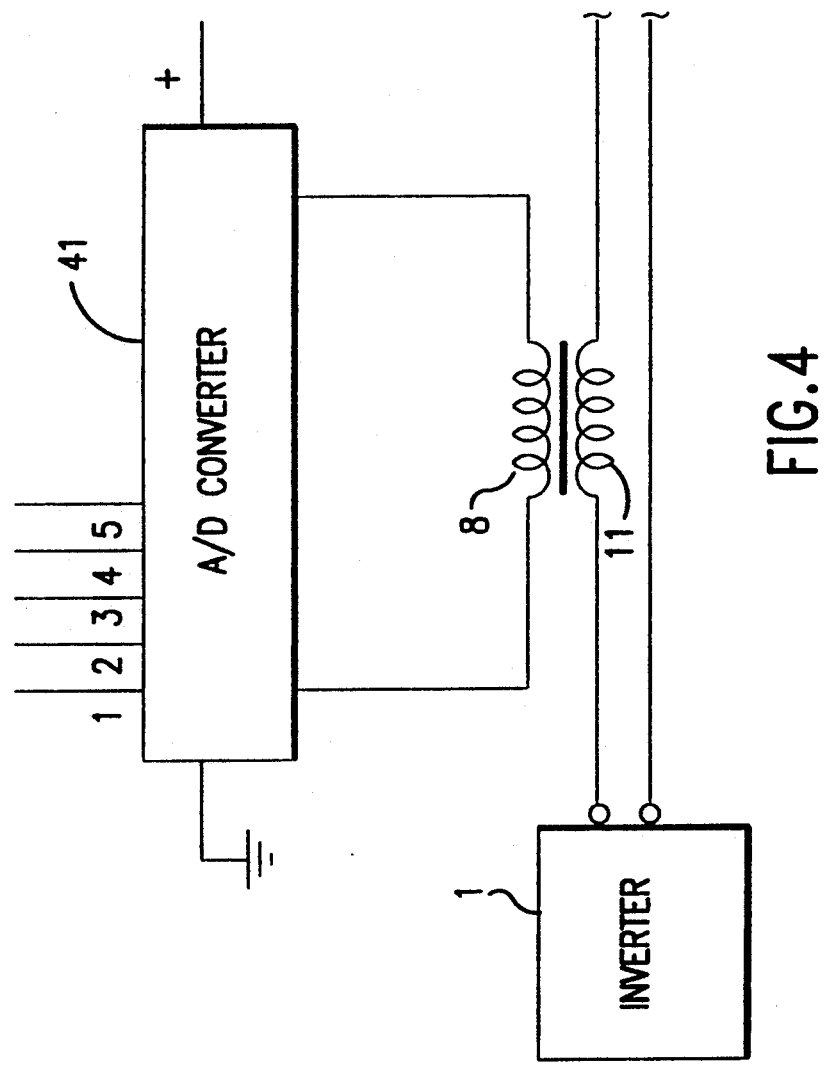
FIG. 4 shows an improvement of the circuit of FIG. 1 designed to minimize the power consumption of the inverter under various low-load conditions.

A measurement of load current is used to control the switching on of the appropriate number of transistor pairs. Load current passing through coil 11 induces a voltage in inductive pickup device 8 of FIG. 1 that is proportional to the load. This voltage is applied to the analog input of analog to digital (A/D) converter 41 of FIG. 4. The A/D converter produces a digital signal indicative of the reciprocal of the load impedance. Digital signals from the A/D converter are used to switch on and off pairs of transistors (Q1 and Q2; Q3 and Q4; Q5 and Q6; etc.) so as to supply sufficient current to the load while minimizing power consumption. Digital output 1 of the A/D converter shown in FIG. 4 is connected to the base of transistor Q1 and to the base of transistor Q2. Likewise, digital output 2 is connected to the base of transistors Q3 and Q4, digital output 3 to the base of transistors Q5 and Q6, and so on.

What is claimed is:

1. A power conservation circuit for use with a voltage inverter powered by a battery and having an AC output voltage for powering a load, comprising:
    input terminal means for accepting electrical inputs, including AC input terminal means for accepting the AC output voltage from the voltage inverter and DC input terminal means for accepting battery voltage from the battery;
    output terminal means for delivering output, including AC output terminal means for delivering the AC output voltage to the load and DC output terminal means for delivering battery voltage to the inverter;
    switch means, connected between the input terminal means and the output terminal means, for switching the circuit between an ON state wherein the AC output voltage is connected to the AC output terminal means, and an OFF state wherein the battery voltage is disconnected from the DC output terminal means; and
    sensing means for (i) sensing in the ON state the absence of a load connected to the AC output terminal means and providing a first signal indicative of the absence of a load and (ii) sensing in the OFF state the presence of a load connected to the AC output terminal means and providing a second signal indicative of the presence of a load;
    wherein the switch means includes means for receiving the first signal and switching from the ON state to the OFF state, and for receiving the second signal and switching from the OFF state to the ON state.

2. A circuit according to claim 1, wherein the switch means includes means for connecting battery voltage to the AC output terminal means.

3. A circuit according to claim 2, wherein the sensing means includes means for sensing current from the battery flowing through the AC output terminal means.

4. A circuit according to claim 3, wherein the switch means further includes a relay having a pole terminal electrically connected to the AC output terminal means, a first contact terminal electrically connected to the AC input terminal means, and a second contact terminal electrically connected to the DC input terminal means.

5. A circuit according to claim 1, wherein the sensing means includes means for sensing AC current flowing through the AC output terminal means.

6. A circuit according to claim 1, wherein the switch means further includes means for connecting to the AC output terminal means an AC signal voltage having a frequency measurably different from the frequency of the AC output voltage.

7. A circuit according to claim 6, wherein the sensing means includes means for sensing AC current at the frequency of the AC signal voltage passing through the AC output terminal means.

8. A voltage inverter, having conversion circuits, output terminals and an AC output voltage, capable of being powered by a battery, the inverter including switch means for switching between an ON state wherein the AC output voltage is connected to the output terminals, and an OFF state wherein battery voltage is connected to the output terminals and disconnected from at least some of the conversion circuits.

9. A voltage inverter according to claim 8 further including a power transistor having a base, wherein the switch means further includes means for switching the base of the power transistor.

10. A voltage inverter according to claim 8, wherein the switch means includes means for connecting battery voltage to the output terminals.

11. A voltage inverter according to claim 10, further including means for sensing current from the battery flowing through the output terminals.

12. A voltage inverter according to claim 9 wherein the means for switching the base of the power transistor is a relay.

13. A voltage inverter according to claim 8, further including a relay having a pole terminal electrically connected to at least one of the output terminals.

14. A voltage inverter according to claim 8, further including means for sensing AC current flowing through the output terminals.

15. A voltage inverter according to claim 8, wherein the switch means further includes means for connecting to the output terminals an AC signal voltage having a frequency measurably different from the frequency of the AC output voltage.

16. A voltage inverter according to claim 15, further including means for sensing AC current at the frequency of the AC signal voltage passing through the output terminals.

* * * * *